Figure 1:
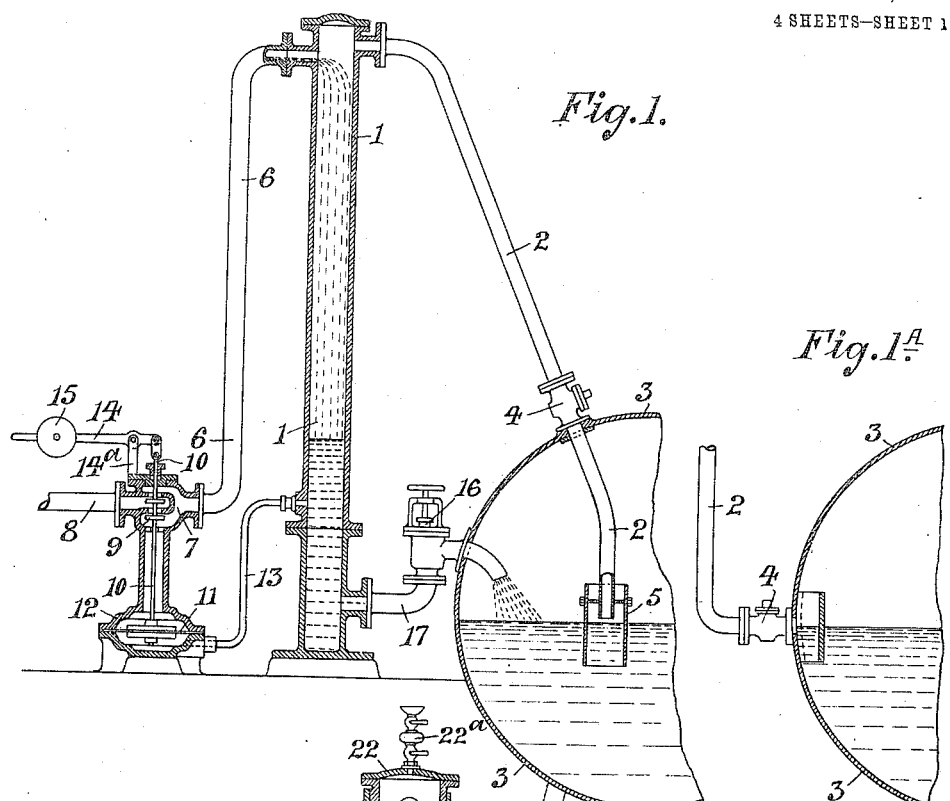

J. WYLLIE.
FEED REGULATOR FOR BOILERS AND THE LIKE.
APPLICATION FILED MAR. 1, 1909.

1,006,038.

Patented Oct. 17, 1911.
4 SHEETS—SHEET 1.

Fig. 1ᴬ.

WITNESSES:

INVENTOR
JAMES WYLLIE
BY
ATTORNEYS

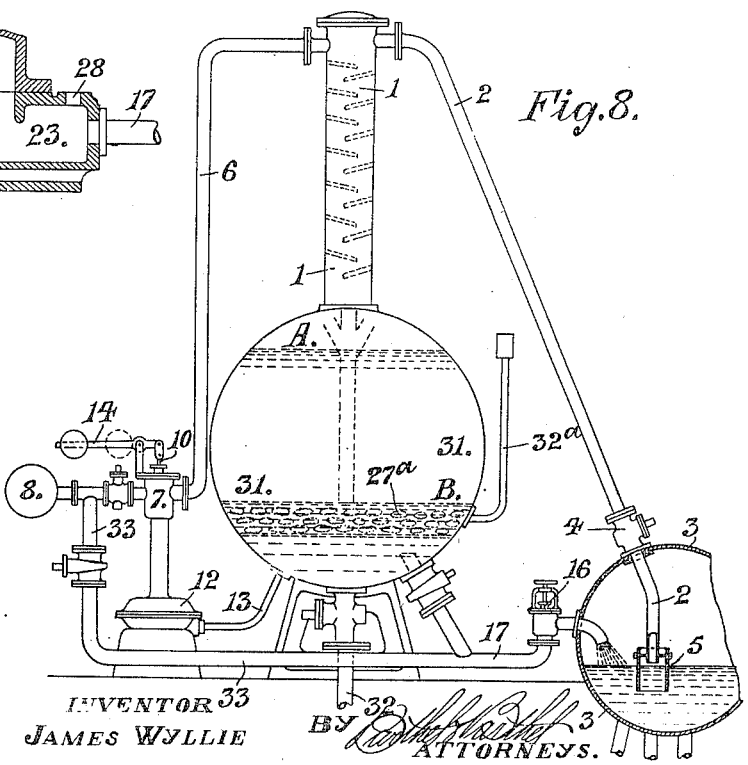

J. WYLLIE.
FEED REGULATOR FOR BOILERS AND THE LIKE.
APPLICATION FILED MAR. 1, 1909.
1,006,038.
Patented Oct. 17, 1911.
4 SHEETS—SHEET 3.
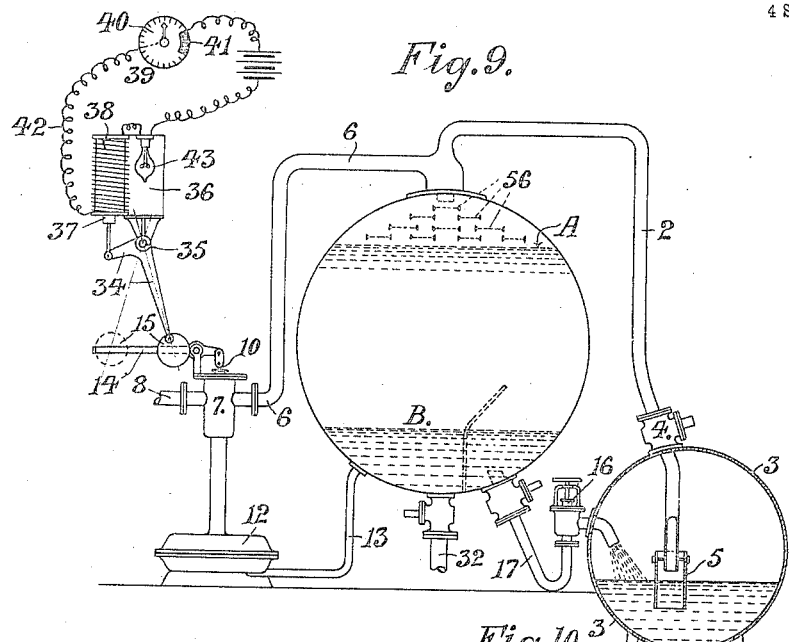
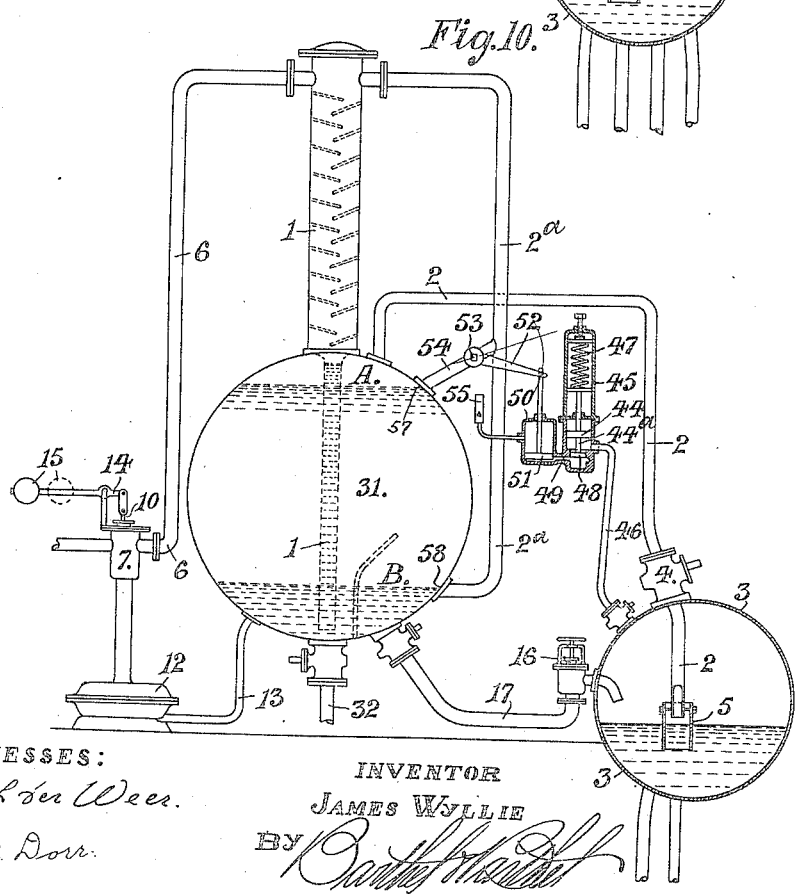
WITNESSES:
G. L. der Weer.
A. M. Dorr.
INVENTOR
JAMES WYLLIE
BY Bartlett Martlet
ATTORNEYS J. WYLLIE.
FEED REGULATOR FOR BOILERS AND THE LIKE.
APPLICATION FILED MAR. 1, 1909.
1,006,038.
Patented Oct. 17, 1911.
4 SHEETS—SHEET 4.
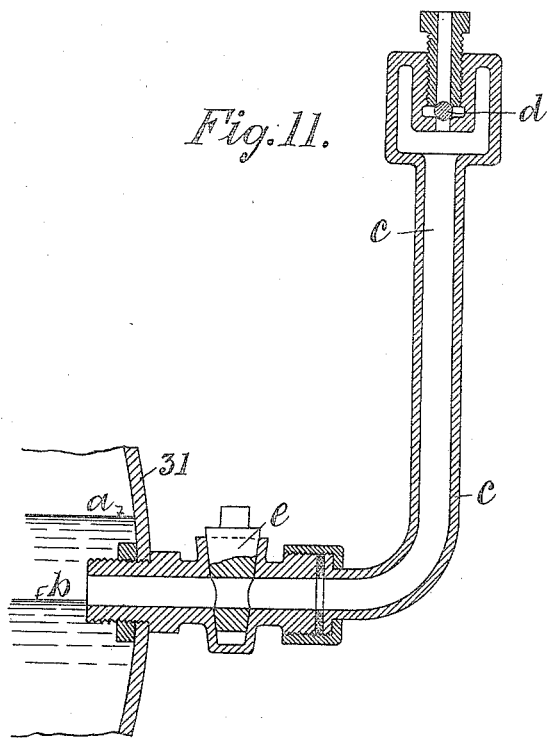
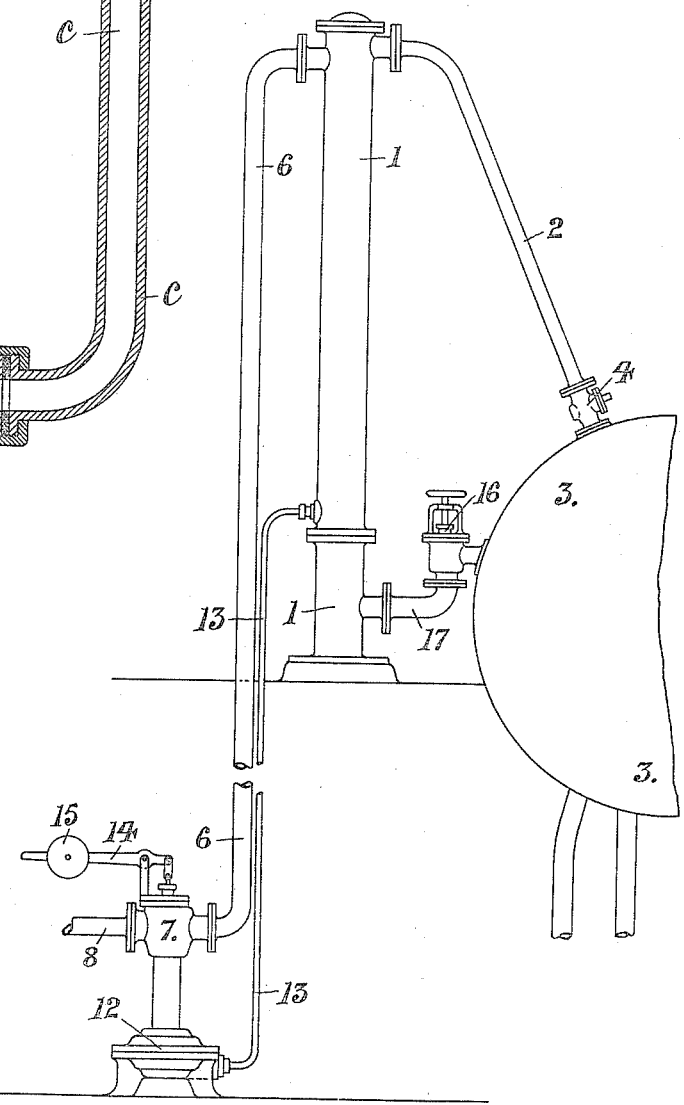
WITNESSES:
A. M. Shannon.
A. M. Dorr.
INVENTOR
James Wyllie
By
Attorneys.

UNITED STATES PATENT OFFICE.

JAMES WYLLIE, OF BLUNDELLSANDS, NEAR LIVERPOOL, ENGLAND.

FEED-REGULATOR FOR BOILERS AND THE LIKE.

1,006,038. Specification of Letters Patent. Patented Oct. 17, 1911.

Application filed March 1, 1909. Serial No. 480,762.

*To all whom it may concern:*

Be it known that I, JAMES WYLLIE, a subject of the King of England, residing at Stratheden, St. Anthony's Road, Blundellsands, near Liverpool, in the county of Lancaster, England, have invented certain new and useful Improvements in and Relating to Feed-Regulators for Boilers and the Like, of which the following is a specification, reference being had therein to the accompanying drawings.

This invention relates to the handling of the feed liquids of concentrating and evaporating apparatus, steam generators, and the like, and has for its purpose:—to provide apparatus, whereby the feed liquid may be heated—and stored—at a temperature approximating that of the steam in the concentrator, evaporator, steam generator, and the like (hereinafter referred to, for the purpose of reference as "boiler") and be always ready to meet either constant or variable requirements of the boiler; this supply being automatically regulated, to insure a steady and predetermined level of liquid in the boiler; and, in some cases, also to control the feed heating steam, so that live steam from the boiler is abstracted only when the steam pressure is at or above the normal working pressure. To provide simple and efficient apparatus, by which the feed liquids may be freed from scale forming ingredients and deleterious gases before it is permitted to pass into the boiler.

In accomplishing these objects, I:—1, obviate the employment of working parts within either the boiler or liquid storage vessel: 2, render the necessary valves and connections readily accessible: 3, provide against negligence on the part of attendants: 4, obviate extreme variations in the temperature of the liquid storage vessel, and thus prevent "racking," due to unequal expansion and contraction of same, and: 5, minimize likelihood of breakdown of the working parts of the apparatus, by removing same from the vibratory influence due to ebullition of liquid in the boiler.

In the drawings, my invention is shown—by way of example—as applied to steam generating apparatus for power purposes.

Figure 2:
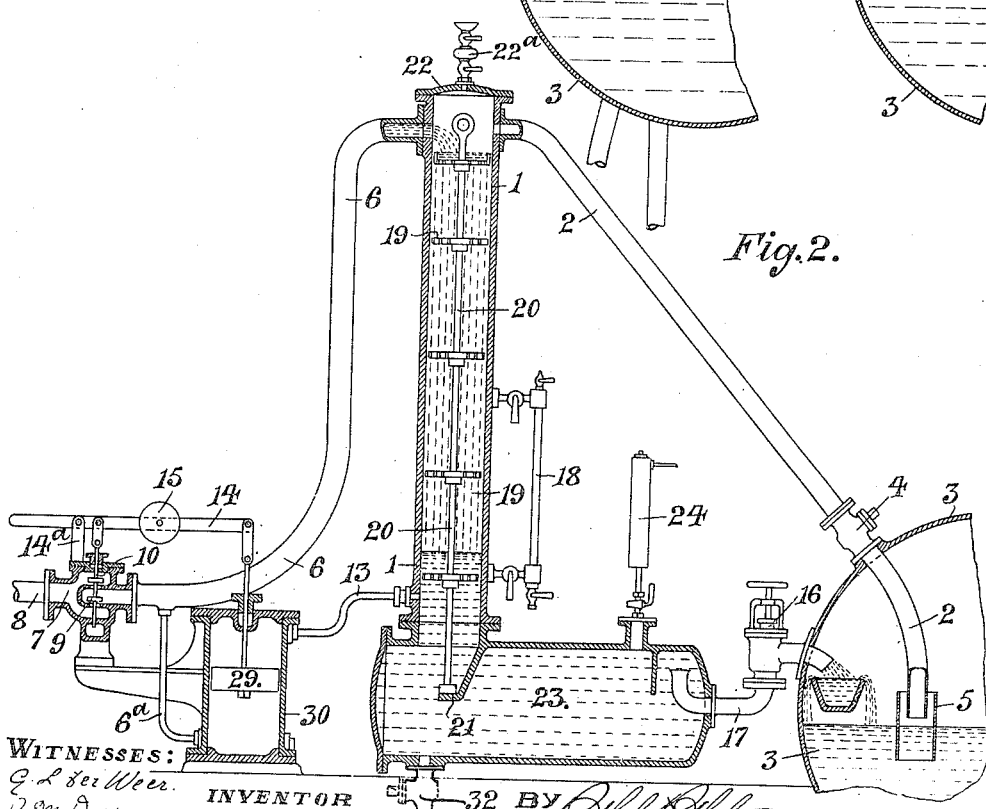

Figure 1 represents in part sectional elevation automatic feed regulating apparatus according to the invention; and Fig. 1ᴬ is a modified detail. Figs. 2 and 3 represent in sectional elevation apparatus for heating and purifying the feed water in combination with the regulating apparatus shown in Fig. 1. Figs. 4 to 7 are details relating to Fig. 3, hereinafter described. Figs. 8 to 10 represent feed water regulating apparatus in combination with water storage vessels. Fig. 11 is a sectional view of a low water line; and Fig. 12 shows a modified construction of feed apparatus illustrated in Fig. 1.

In the drawings, like figures of reference denote like or corresponding parts wherever they occur.

Referring to the drawings, but more particularly to the feed water controlling apparatus as shown in Fig. 1, 1 indicates the mixing vessel, and 2 a pipe communicating with the upper portion of said mixing vessel 1, and opening to the boiler at the normal or predetermined water level. 4 is a stop valve on said pipe 2; and 5 is a cylinder disposed around the lower part of pipe 2, to shield the mouth of said pipe from surface scum. 6 is a pipe leading from the valve chamber 7 and entering the upper part of said mixing vessel 1. 8 is the feed water supply pipe, and 9 (see Fig. 2) is a double seat valve mounted upon the spindle 10, which in turn is connected with the diaphragm 11 disposed within the chamber 12. 13 is a pipe leading from the underside of diaphragm 11 to the lower part of the mixing vessel 1, and 14 is a lever provided with an adjustable counter weight 15, by means of which the normal level of water in the mixing vessel may be regulated and—as observed by the aid of the gage glass 18—the correct adjustment of the valve insured: this lever also affords a means of testing the valve under working conditions. Any other suitable means of effecting this object, may, however, be employed.

16 represents a non-return or check valve of the type usually fitted to steam boilers, which valve is in communication with mixing vessel 1 through branch 17 at or near the bottom thereof, and with the boiler 3 at any convenient point.

In some cases it may be necessary or desirable to dispose the diaphragm chamber and water regulating valve above, or it may be considerably below, the level of the mixing vessel 1. Under the conditions, as illustrated in Figs. 1 and 2, in which the level of the water in the boiler has fallen below the mouth of pipe 2, the feed water regulating valve is open, and feed water passes up the pipe 6 and showers into the mixing vessel 1 in which it accumulates until its head is sufficient to overcome the weight of the check valve 16, through which it flows to the boiler. The upper face of the diaphragm is subjected to pressure governed by the head of water as represented by the height of the water column between it and the upper end of pipe 6, while the lower side is subjected to pressure as represented by the height of the water column between it and the surface of water in the mixing vessel 1, communication being effected through pipe 13 in obvious manner. The water in pipe 6 and in the mixing vessel 1 being both subjected to the pressure of steam from the boiler, such pressure does not affect the diaphragm, which is controlled only through the difference of the heads of water referred to. To provide communication between the pipe 6 and the diaphragm chamber 12 sufficient clearance is left around the spindle 10; or, a separate connection may be provided for this purpose—as shown for instance in Fig. 2. When the water level in the boiler rises, due to the incoming feed, steam is shut off by it from pipe 2 and mixing vessel 1, and the steam then within same condenses; and a partial vacuum being formed water from the boiler passes up pipe 2 and into the mixing vessel 1, which together with the water issuing from pipe 6 causes the lower face of the diaphragm to be subjected to a relatively superior head, and through its consequent movement closes the valve 9 to cut off the feed water supply.

In action, the level of water in mixing vessel 1 will tend to be fairly constant owing to the fact that, when a variation in level occurs, the movement is simultaneously communicated, through the diaphragm 11 to the valve 9, and the quantity of water flowing into the mixing vessel is thus controlled. In this condition the level of water in the boiler is in such close proximity to the mouth of pipe 2 that some water will be carried by the steam up to the mixing vessel and so maintain the ultimate pressure of steam in mixing vessel 1 slightly below that in the boiler. Further, due to the small variation of water level in mixing vessel 1, and consequent small movement of the diaphragm, the water in contact with the diaphragm is more or less static, with the result that the diaphragm chamber will become cool; and therefore a diaphragm of rubber may be safely employed. In Fig. 1^A, conduit 2 is shown connected with the boiler at about the water level.

In combination with feed water regulating apparatus as before described, it is desirable or necessary to employ means of heating and, in some cases, purifying the feed water prior to entering the boiler, and such means, according to my invention are illustrated in Figs. 2 and 3 of the drawings annexed hereto.

Referring now more particularly to Fig. 2 I provide within the mixing vessel 1 perforated trays 19, these trays being carried by a spindle 20 supported at its lower end by means of the foot piece 21, in order that it and the trays may be lifted out for cleaning purposes and replaced conveniently when the cover 22 of mixing vessel 1 is removed. Below said mixing vessel and communicating therewith is a small receptacle 23 in which impurities in the feed water which are rendered insoluble in passing through the mixing vessel 1 are deposited before the water enters the boiler 3 by way of the check valve 16. This receptacle also affords facility for the depositing of impurities rendered insoluble by treatment chemically, say by means of re-agents introduced by the measuring device 22^a. I also prefer to provide means of permitting any gases liberated—due to the elevation of the temperature of the feed water in passing through the mixing vessel—to escape, and to this end I preferably employ an expansion trap or valve 24 of any known suitable type, in which the liberated gases collect and cause—due to their decreased temperature— the valve to open and permit of their discharge. In some cases, I may provide a chamber in communication with said expansion trap or valve in which the gases may collect prior to discharge.

In cases where the feed water is of sufficient purity to permit of it, I prefer to employ perforated plates 19 within the mixing vessel 1 as illustrated in Fig. 2; but, where such an arrangement is not permissible, due to the impurities of the feed water, I prefer to employ the inclined imperforate plates 25 illustrated in Fig. 3. This disposition of the plates permits of a large water surface being exposed to steam. Further, these plates 25 may be serrated in the manner shown in Fig. 4 to enhance the end in view. As an additional means of facilitating the deposit of impurities within the receptacle 23 I may employ baffle plates or screens upon which the impurities may be deposited.

In the arrangement illustrated in Fig. 3 I employ two imperforate plates 26 of the contour shown in Fig. 5, and three circular screens 27 of perforate metal or wire gauze. It will be obvious, however, that the number and arrangement of these baffles or screens may be varied according to requirements. Where requisite or desirable a plurality of receptacles connected in series may be employed, with or without the baffles or screens referred to.

In cases where the condition of the feed water is such that only a small receptacle 23 is requisite, the arrangement illustrated in Fig. 6 may be conveniently employed, in which the receptacle is formed within the support for the mixing vessel 1. The liberated gases may escape through the aperture 28, or an expansion trap or cock may be fitted thereto.

In Fig. 7 is shown a convenient means of securing the cover of mixing vessel 1 in position.

Referring again to Fig. 2 of the drawings, there is shown a modified means of controlling the feed water valve in lieu of the diaphragm described in Figs. 1 and 2. In this arrangement, a piston 29 is disposed within the cylinder 30, the rod of which piston is linked with the lever 14 which latter is pivoted to the arm 14$^a$. Lever 14 is also linked to the valve spindle 10. The pressure due to the head of water in the mixing vessel 1 and pipe 13 acts upon the upper side of the piston to close the valve, while the head of water as indicated by the height of pipe 6 and branch 6$^a$ acts upon the underside of the piston to open the valve: this is—for convenience in balancing the parts—a converse arrangement to that shown in Figs. 1 and 2.

Referring now generally to Figs. 8 to 10, but more particularly to Fig. 8 there is illustrated in combination with feed regulating apparatus a storage vessel, capable of storing a large volume of feed water at a temperature approximating that of the steam in the boiler 3. Virtually this storage vessel 31 may be considered as an enlargement of the lower end of the mixing vessel and, in consequence, the variation of water level in the mixing vessel, effected by varying the pressure on the regulating valve may be utilized for filling and emptying said vessel. This storage vessel 31 also constitutes a receptacle for the deposit of insolvent impurities from the feed water, which impurities may be collected by baffles or screens, or deposited upon an open filter bed, composed of stones or the like 27$^a$, see Fig. 8. 32 is a drain pipe. A de-aerating trap or valve, such as described with reference to Fig. 2 may also be fitted to the storage vessel, and for the greater safety of the boiler, a low water alarm 32$^a$, Fig. 8, may be fitted to the storage vessel at a point below the normal lower working level B. The apparatus illustrated in Fig. 11, consists of an inverted siphon $c$, the lower end of which is fitted to said storage vessel 31, the upper end of the siphon is closed with a fusible disk or plug $d$ so arranged that when the water level falls below the normal lower level $a$, say to $b$, steam will enter siphon $c$, permitting the water which has been held up in tube $c$ to run out, and taking its place. The steam will heat up the tube and fittings generally until the plug $d$ has reached a temperature at which it will fuse, when the pressure of steam will blow it out. The escaping steam will warn attendants of unusually low level of water in the storage vessel 31.

$e$ is a stop cock to permit a blown out fuse to be replaced. Any other form of low water alarm may however be applied. This arrangement of storage vessel is particularly applicable for use when a boiler is required to meet a heavy demand for steam such as occurs in electrical generating stations, and on these occasions the balance weight 14 of the regulating valve may be moved from the inner position to the outer end of the lever as indicated by the dotted lines to cut off the further supply of cold water and consequent draft of live steam from the boiler, until such time as the hot water in the storage vessel is reduced to the minimum level B. When the water has been lowered to this level the valve will, without further adjustment, automatically re-open and continue to supply water in equal quantity to that being evaporated in the boiler 3.

When the abnormal demand for steam has ceased, the balance weight may be moved back to its normal position, when the feed water will, as before, accumulate in the vessel 31 until the maximum level A has been reached; the water in the vessel 31 is then ready to again meet a heavy load. It will thus be seen that the simple movement of the balance weight is all that is necessary to meet abnormal requirements, and although its operation in either one direction or the other may be neglected by an attendant, the continuity of the feed to the boiler is unaffected.

33 represents a by-pass connection disposed between the cold water supply pipe and the hot feed water pipe leading to the check valve 16 in order that the apparatus may be disconnected for cleaning purposes while the boiler is under working conditions. A similar by-pass connection may also advantageously be applied to the apparatus shown in Figs. 1, 2, 9, and 10 of the drawings. Provisions may however be made for automatically controlling the quantity of feed water in the vessel 31, and to this end I may employ an electrical solenoid device, such, for instance, as illustrated in Fig. 9, in which 34 is a bell crank lever pivoted at 35 to a bracket 36; one arm of said lever is connected to the movable weight 15 mounted upon lever 14, while the other arm is connected with the armature 37 of coil 38.

39 is a meter, say—for instance—a pressure gage, the finger 40 of which is adapted to make contact with a terminal 41 and close the circuit 42 when the steam pressure in the boiler 3 falls, and thus the weight 15 is moved from its inner position as indicated by full line to its outer position as indicated by dotted line, to effect the end in view.

43 represents an incandescent lamp which is lighted when the circuit is closed, or there may be also employed a bell which is actuated on the closing of the circuit in well known manner. The valve 9 may be controlled in similar manner through a moving element upon any meter used for indicating the boiler loads.

The function of the upper part of the mixing vessel hereinbefore referred to, namely, to bring the incoming feed water into intimate contact with steam, is performed by plates, trays, or baffles 56 of any ordinary type, as illustrated diagrammatically in Fig. 9. Alternatively, to automatically control the quantity of feed water in vessel 31, I may employ a steam piston operated by an escape valve such as illustrated in Fig. 10, in which arrangement 44 represents a piston disposed within the cylinder 45. Said piston 44 is adapted to be raised by boiler steam issuing through the pipe 46 against the resistance of the spring 47. The piston rod 44$^a$ of said piston 44 carries at its lower end a small valve 48. This valve is adapted to open or close a passage 49 communicating with a second cylinder 50 within which is disposed a piston 51 connected to an arm 52 adapted to open and close a cock or valve 53 disposed in the conduit 54 communicating with the storage vessel 31 and pipe 2$^A$.

55 represents a whistle in communication with said cylinder 50. When the parts are in the positions illustrated the boiler pressure is sufficient to overcome the resistance of spring 47 and maintain the piston 44 in its uppermost position, and consequently valve 48 closes the lower end of cylinder 45 to steam. When, however, the boiler pressure falls below the predetermined pressure, piston 44 is forced downward by spring 47, the valve 48 opens, and steam is permitted to enter cylinder 50, and force piston 51 upward, to close the pipe connection 54 and also sound the whistle 55.

In the modification illustrated in Fig. 10, the diaphragm 11 and through it, valve 9 is controlled, as usual, through the head of water in pipe 6 acting on the upper side of diaphragm, as opposed to the head of water in mixing vessel 1 acting on the underside of said diaphragm; which vessel 1, in this case, extends to a point near the bottom of vessel 31 (or in some instances vessel 31 may be disposed entirely outside said mixing vessel, and communication made between them in any convenient manner); and the supply of water to the vessel 31, by way of mixing vessel 1, is controlled through the sealing and un-sealing of either the port opening 57 or 58 to pipe 2$^A$, which pipe 2$^A$ communicates with the upper portion of mixing vessel 1. The admission of water from vessel 31 to boiler 3 is controlled by the level of water in said boiler as before described, that is, when the mouth of pipe 2 is unsealed by the falling of water level in the boiler, steam will enter vessel 31 through pipe 2, to permit of the water in said vessel 31 flowing to the boiler in obvious manner. When the stop cock 53 on the branch 54 is shut, the water in vessel 31 will not rise above the minimum level B, and when it is required to raise the water to the maximum level A, cock 53 is opened by hand, or automatically, say, by the solenoid or piston devices illustrated; or by other suitable means. Steam from boiler 3 passes to the vessel 31 by way of pipe 2, and when cock 53 is closed, the level of water in said vessel 31 must fall to—or somewhat below—the level B before the steam can escape through pipe 2$^A$, to relieve the tension in mixing vessel 1; the steam thus passing to the top of mixing vessel 1 will permit the water level in said mixing vessel to fall to a point at which the difference of pressure acting on diaphragm 11 causes the supply valve to be operated to maintain the normal water level in mixing vessel 1, and therefore the level in vessel 31 at B, in the manner previously described. The effect of opening cock 53 is to nullify, or render inoperative, for the time being, the lower end of pipe 2$^A$, as steam passes through port 57 to the top of mixing vessel 1 until the water level is raised to the point A, at or about which point port 57 is closed and the supply valve actuated through diaphragm 11, as above described.

This invention may obviously be applied to boilers (land and marine) other than of the water tube type, and also, as before stated to concentrating and evaporating apparatus generally.

Having now described my invention, what I claim as new and desire to secure by Letters Patent is:—

1. Liquid feed regulating apparatus comprising a steam vessel; a liquid receptacle; a conduit communicating with the upper part of said receptacle and with said steam vessel at a predetermined liquid level; a conduit communicating with the upper part of said liquid receptacle and with the feed liquid supply; a valve controlling element; a conduit communicating with said liquid receptacle at a point below said first mentioned conduits and with said valve controlling element; a valve, and means adapted to operate said valve through the difference of the opposed liquid heads; and a conduit communicating with the lower part of said liquid receptacle and with said steam vessel.

2. Liquid feed regulating apparatus, comprising a steam vessel; a liquid receptacle; a conduit communicating with the upper part of said receptacle and with said steam vessel at a predetermined liquid level; a conduit communicating with the upper part of said liquid receptacle, and with the feed liquid supply; a valve controlling element; a conduit communicating with said liquid receptacle at a point below said first mentioned conduits and with said valve controlling element; a valve, and means adapted to operate said valve through the difference of the opposed liquid heads; means of regulating the balance of said valve; and a conduit communicating with the lower part of said liquid receptacle and with said steam vessel.

3. Liquid feed regulating apparatus, comprising a steam vessel; a liquid receptacle; a conduit communicating with the upper part of said receptacle and with said steam vessel at a predetermined liquid level; a conduit communicating with the upper part of said liquid receptacle and with the feed liquid supply; a valve controlling element; a conduit communicating with said liquid receptacle at a point below said first mentioned conduits and with said valve controlling element; a valve, and means adapted to operate said valve through the difference of the opposed liquid heads; means of automatically regulating the balance of said valve; and a conduit communicating with the lower part of said liquid receptacle and with said steam vessel.

4. Liquid feed regulating apparatus, comprising a steam vessel; a liquid receptacle; a second liquid receptacle in communication with said first mentioned liquid receptacle; a conduit communicating with one of said receptacles and with said steam vessel at a predetermined liquid level; a conduit communicating with the upper part of said first mentioned receptacle and with the feed liquid supply; a valve controlling element; a conduit communicating with one of said liquid receptacles at a point below said first mentioned conduits and with said valve controlling element; a valve, and means adapted to operate said valve through the difference of the opposed liquid heads; means of automatically regulating the balance of said valve; and a conduit communicating with said second mentioned liquid receptacle and with said steam vessel.

5. Liquid feed regulating apparatus, comprising a steam vessel; a liquid receptacle; a second liquid receptacle in communication with said first mentioned liquid receptacle; a conduit communicating with one of said liquid receptacles and with said steam vessel at a predetermined liquid level; a conduit communicating with the upper part of said first mentioned liquid receptacle and with the feed liquid supply; a valve controlling element; a conduit communicating with one of said receptacles at a point below said first mentioned conduits and with said valve controlling element; a valve, and means adapted to operate said valve through the difference of the opposed liquid heads; a meter; means of automatically regulating the balance of said valve through a moving element of said meter; and a conduit communicating with said second mentioned liquid receptacle and with said steam vessel.

6. Liquid feed regulating apparatus, comprising a steam vessel; a liquid receptacle; a second liquid receptacle in communication with said first mentioned liquid receptacle; a conduit communicating with one of said liquid receptacles and with said steam vessel at a predetermined liquid level; a conduit communicating with the upper part of said first mentioned liquid receptacle and with the feed liquid supply; a valve controlling element; a conduit communicating with one of said liquid receptacles at a point below said first mentioned conduits and said valve controlling element; a valve, and means adapted to operate said valve through the difference of the opposed liquid heads; means adapted to automatically regulate the balance of said valve through the rise and fall of steam pressure; and a conduit communicating with said second mentioned liquid receptacle and with said steam vessel.

7. Liquid feed regulating apparatus, comprising a steam vessel; a liquid receptacle; a second liquid receptacle in communication with said first mentioned liquid receptacle; a conduit communicating with one of said receptacles, and with said steam vessel at a predetermined liquid level; a conduit communicating with the upper part of said first mentioned liquid receptacle and with the feed liquid supply; a valve controlling element; a conduit communicating with one of said liquid receptacles at a point below said first mentioned conduits and with said valve controlling element; a valve, and means adapted to operate said valve through the difference of the opposed liquid heads; a conduit communicating with said second mentioned liquid receptacle and with said steam vessel; a conduit communicating with the lower portion of said second mentioned liquid receptacle and with the upper portion of said first mentioned liquid receptacle; a branch conduit communicating with said second mentioned liquid receptacle and with said last mentioned conduits; a valve in said branch conduits, and means for actuating said valve.

8. Liquid feed regulating apparatus, comprising a steam vessel; a liquid receptacle; a second liquid receptacle in communication with said first mentioned liquid receptacle; a conduit communicating with one of said liquid receptacles, and with said steam vessel at a predetermined liquid level; a conduit communicating with the upper part of said first mentioned liquid receptacle and with the feed liquid supply; a valve controlling element; a conduit communicating with one of said liquid receptacles at a point below said first mentioned conduit and with said valve controlling element; a valve, and means adapted to operate said valve through the difference of the opposed liquid heads; a conduit communicating with said second mentioned liquid receptacle and with said steam vessel; a conduit communicating with the lower portion of said second mentioned liquid receptacle and with the upper portion of said first mentioned liquid receptacle; a branch conduit communicating with said second mentioned liquid receptacle and with said last mentioned conduit; a valve in said branch conduit; a meter; and means for automatically actuating said valve through a moving element of said meter.

9. Liquid feed regulating apparatus, comprising a steam vessel; a liquid receptacle; a second liquid receptacle in communication with said first mentioned liquid receptacle; an alarm adapted to be actuated on the fall of liquid level below a predetermined level in said second mentioned liquid receptacle; a conduit communicating with one of said liquid receptacles, and with said steam vessel at a predetermined liquid level; a conduit communicating with the upper part of said first mentioned liquid receptacle and with the feed liquid supply; a valve controlling element; a conduit communicating with one of said liquid receptacles at a point below said first mentioned conduits, and with said valve controlling element; a valve, and means adapted to operate said valve through the difference of the opposed liquid heads; and a conduit communicating with said second mentioned liquid receptacle and with said steam vessel.

In testimony whereof I affix my signature in presence of two witnesses.

JAMES WYLLIE.

Witnesses:
JOHN HINDLEY WALKER,
WILLIAM DUNCAN McCARTER.